(12) United States Patent
Vollmer

(10) Patent No.: US 6,509,301 B1
(45) Date of Patent: Jan. 21, 2003

(54) WELL TREATMENT FLUIDS AND METHODS FOR THE USE THEREOF

(76) Inventor: Daniel Patrick Vollmer, 143 L'Ambiance Cir., Lafayette, LA (US) 70508

( * ) Notice: Subject to any disclaimer, the term of this patent is extended or adjusted under 35 U.S.C. 154(b) by 126 days.

(21) Appl. No.: 09/648,327

(22) Filed: Aug. 25, 2000

Related U.S. Application Data

(63) Continuation-in-part of application No. 09/383,323, filed on Aug. 26, 1999.

(51) Int. Cl.$^7$ .............................. C09K 3/00; E21B 43/26
(52) U.S. Cl. ...................... 507/236; 507/203; 507/266; 507/269; 507/277; 507/128; 507/922; 166/308
(58) Field of Search .................................. 507/128, 236, 507/922, 240, 266, 269, 277, 203; 166/308

(56) References Cited

U.S. PATENT DOCUMENTS

| | | | |
|---|---|---|---|
| 2,793,189 A | 5/1957 | Schuessler | 252/8.5 |
| 2,943,051 A | 6/1960 | Lummus | 252/8.5 |
| 3,006,845 A | 10/1961 | Van Dyke | 252/8.5 |
| 3,057,797 A | 10/1962 | Anderson | 252/8.5 |
| 3,761,410 A | 9/1973 | Mondshine et al. | 252/8.5 C |
| 3,960,736 A | 6/1976 | Free et al. | 252/8.55 R |
| 4,259,191 A | 3/1981 | Wagner | 252/8.55 D |
| 4,323,124 A | 4/1982 | Swan | 166/303 |
| 4,502,540 A | 3/1985 | Byham | 166/274 |
| 4,517,100 A | 5/1985 | Nance et al. | 252/8.5 C |
| 4,614,236 A | 9/1986 | Watkins | 166/304 |
| 4,704,229 A | 11/1987 | Brunel | 252/352 |
| 4,796,702 A | 1/1989 | Scherubel | 166/308 |
| 5,057,234 A | 10/1991 | Bland et al. | 252/8.51 |
| 5,141,920 A | 8/1992 | Bland et al. | 507/136 |
| 5,238,067 A | 8/1993 | Jennings, Jr. | |
| 5,318,956 A | 6/1994 | Mueller | 507/139 |
| 5,360,558 A | 11/1994 | Pakulski | 252/8.551 |
| 5,432,152 A | 7/1995 | Dawson et al. | 507/103 |
| 5,529,122 A | 6/1996 | Thach | |
| 5,551,516 A | 9/1996 | Norman et al. | 166/308 |
| 5,593,954 A | 1/1997 | Malchow, Jr. | 507/135 |
| 5,707,940 A | 1/1998 | Bush et al. | 507/138 |
| 5,710,109 A | 1/1998 | Surles | |
| 5,807,810 A | * 9/1998 | Blezard et al. | 507/103 |
| 5,964,295 A | 10/1999 | Brown et al. | 166/308 |
| 5,979,557 A | 11/1999 | Card et al. | |
| 6,035,936 A | 3/2000 | Whalen | 166/308 |
| 6,194,354 B1 | * 2/2001 | Hatchman | 507/134 |

FOREIGN PATENT DOCUMENTS

| | | | |
|---|---|---|---|
| GB | 2 001 377 A | 1/1979 | |
| WO | WO 98/56497 | 12/1998 | |
| WO | WO 99/24693 | 5/1999 | E21B/43/26 |

OTHER PUBLICATIONS

A. Murthy, et al., "Spontaneous Vesicles from Aqueous Solutions of Aerosol OT and Choline Chloride Compounds," *Journal of Colloid and Interface Science*, vol. 145, No. 2, pp. 598–600, 1991.

(List continued on next page.)

*Primary Examiner*—Philip Tucker
(74) *Attorney, Agent, or Firm*—Baker Botts LLP

(57) ABSTRACT

This invention relates to a well treatment fluid and a method to treat an/or fracture a subterranean formation comprising:

injecting a well treatment fluid into the formation at sufficient pressure to fracture the formation wherein the fluid comprises:
(a) one or more amphoteric surfactants;
(b) water;
(c) one or more nonaqueous solvents;
(d) optionally, an acid forming compound; and
(e) provided that if the acid forming compound is present a hydrophilic alcohol may also be optionally present;

wherein the all or part of the fluid forms vesicles.

45 Claims, 1 Drawing Sheet

OTHER PUBLICATIONS

J. Bergenholtz, et al., "Formation of AOT/Brine Multilamellar Vesicles," *Langmuir*, vol. 12, No. 13, pp. 3122–3126, 1996.

A. Firouzi, et al., "Cooperative Organization of Inorganic–Surfactant and Biomimetic Assemblies," *Science*, vol. 267, pp. 1138–1143, 1995.

M. Gradzielski, et al., "Novel Gel Phase: A Cubic Phase of Densely Packed Monodisperse, Unilamellar Vesicles," *J. Phys. Chem. B.*, vol. 101, No. 10, pp. 1719–1722, 1997.

S. Chiruvolu, et al., "Microstructure of Complex Fluids by Electron Microscopy," Chapter 5 of *ACS Symposium Series 578: Structure and Flow in Surfactant Solutions*, ed. C. Herb, et al., American Chemical Society, pp. 86–104, 1993.

M. Spector, et al., "Topology of Multivesicular Liposomes, a Model Biliquid Foam," *Langmuir*, vol. 12, No. 20, pp. 4704–4708, 1996.

S. Walker, et al., "Controlled Multi–Stage Self–Assembly of Vesicles," *Mat. Res. Soc. Symp. Proc.*, vol. 372, pp. 95–100, 1995.

S. Walker, et al., "Electrostatic Control of Spontaneous Vesicle Aggregation," *Langmuir*, vol. 13, No. 19, pp. 5076–5081, 1997.

Kirk–Othmer Encyclopedia of Chemical Technology, John Wiley & Sons, 1995, 4th ed., vol. 15, pp. 192–210.

Alberts et al., "Membrane Structure," *Molecular Biology of the Cell*, 3d ed., pp. 478–484 (1994).

Zheng et al., Cryo–TEM Imaging the Flow–Induced Transition from Vesicles to Threadlike Micelles, *The Journal of Physical Chemistry*, vol. 104, No.22, pp. 5263–5271 (Jun. 8, 2000).

Zheng et al., "Mixed Micelles of Nonionic Surfactants and Uncharged Block Copolymers in Aqueous Solutions: Microstructure Seen by Cryo–TEM," *Langmuir*, vol. 16, No. 16, pp. 6453–6459 (Aug. 8, 2000).

Bellare et al., "Controlled Environment Vitrification System: An Improved Sample Preparation Technique," *Journal of Electron Microscopy Technique* 10:87–111 (1988).

Zubay G, *Biochemistry*, third edition, pp.174–175 (1993).

Alberts et al., "Membrane Structure," *Molecular Biology of the Cell*, third edition, pp. 478–480 (1994).

*The Journal of Physical Chemistry*, vol. 98, No. 23, p. 5987 (1994).

Search Report GB 0109537.1 (Date of Search Sep. 24, 2001).

Kullenberg, "Lecithin in Animal Health and Nutrition", Lecithins: Sources, Manufacture & Uses, The American Oil Chemists Society, Champaign, Illinois, pp. 237–252, (1989).

* cited by examiner

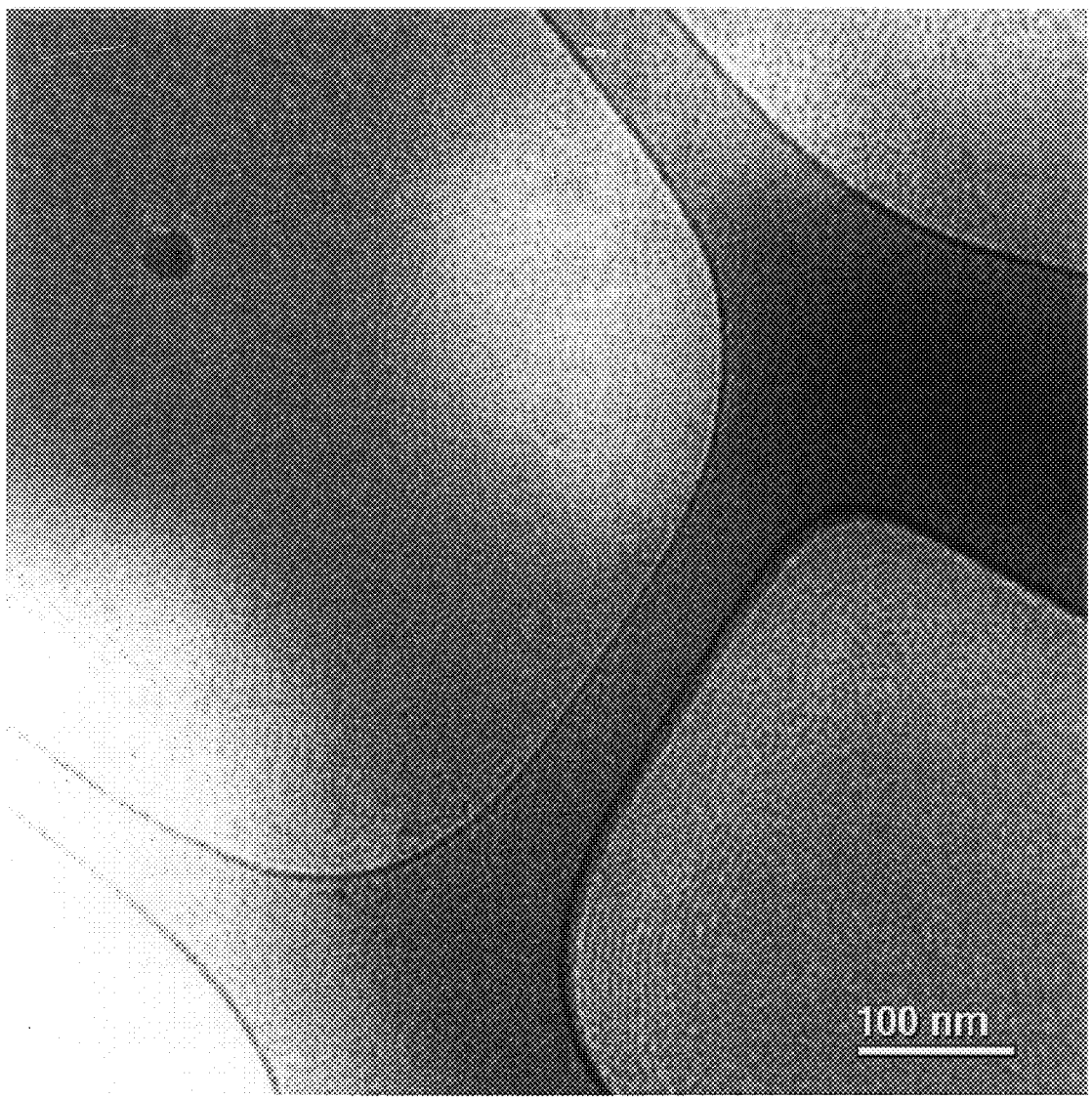

WELL TREATMENT FLUIDS AND METHODS FOR THE USE THEREOF

CROSS REFERENCE TO RELATED APPLICATIONS

This application is a continuation in part of U.S. patent application Ser. No. 09/383,323, filed Aug. 26, 1999 pending. This invention is also related to U.S. patent application Ser. No. 09/383,999 filed Aug. 26, 1999 now abandoned.

FIELD OF THE INVENTION

This invention relates to well treatment fluids comprising amphoteric surfactants and methods of using those fluids to treat and/or fracture subterranean formations.

BACKGROUND OF THE INVENTION

Hydraulic fracturing is used by the petroleum industry to increase well productivity or injectivity by creating highly conductive paths some distance from the well bore in a formation. The fracturing is created by injecting suitable fluids into the well under pressure until the reservoir rock fractures.

Water soluble polymers have been extensively used in the petroleum industry to enhance the productivity of oil and gas operations. These polymers have been used in drilling fluids, gravel pack fluids, fluid loss circulation, and hydraulic fracturing. These techniques have one priority in common and that is the ability of the water soluble polymer to suspend solids. Common water soluble polymers used are hydroxy ethyl cellulose (HEC), xanthan gum, crosslinked guar and its derivatives. HEC is typically used for low temperature applications due to its high decrease in viscosity with increase in temperature. Xanthan gum has superior suspension properties over HEC especially at higher temperatures, but because of its higher molecular weight, xanthan gum tends to filter out at the formation face at low permeabilities (less than 50 md ($5 \times 10^{-8}$ m$^2$)). This is adequate for drill-in fluids since acid and/or oxidizers are subsequently used to remove most of the polymer damage. Xanthan gum is not typically used for hydraulic fracturing because of the difficulty in placing the acid over the proppant if filtered out. If the permeability is high enough for the xanthan gum to flow through the formation, the polymer has a tendency to impart formation damage. Therefore, crosslinked guar and its derivatives have been developed that minimize formation invasion by incorporating a filter cake. Breakers are typically added to the fluid so that they react within the filter cake to allow ease of the oil and gas during flowback. However, the filter cake is typically broken in fragments and is entrained by the proppant, thereby reducing well conductivity.

U.S. Pat. No. 3,960,736 discloses an acid type breaker for lowering the viscosities of polysaccharide solutions using organic esters. In the examples, the pH needs to be lowered to about 3 using an ester to reduce viscosity by 50% within 4 hours from the solution without an ester. If the pH is about 5 to 6, then a longer time of about 24–72 hours are required. In acid soluble formations containing limestone this breaking time cannot be predicted since acid hydrolyzed ester can react with the limestone instead of the polysaccharide.

U.S. Pat. No. 5,551,516 discloses cationic surfactants based upon quaternary ammonium halide salts. The compositions appear to have stable fluid viscosities of about 225° F. (107° C.) and are disclosed to be useful in fracturing. However, they fail to address the problems that can occur, like formation damage and ease of flowback by reducing the viscosity after fracture is completed.

WO 99/24693 discloses viscoelastic surfactant fracturing fluids comprising an aqueous medium, an inorganic water soluble salt, a surfactant (anionic, non-ionic or hydrotropic), and optional organic alcohols. Although not mentioned in the disclosures, WO 99/24693's examples produce acidic solutions having a pH less than 2.0. Flowing these types of fluids through Berea sandstone cores produces extreme formation damage (more than 90% damage). The acidic viscous solution reacts with acid soluble materials within the core. Once dissolved the acid insoluble materials are released. Then the viscous solution carries these materials within the core and plugs the pore throats. These problems render WO 99/24693's compositions commercially non-viable.

The inventor herein has discovered that WO 99/24693's acidic solutions can be made neutral or basic without substantially affecting its viscosity. Although this imparts less formation damage, removing the viscous solution is difficult and requires days or weeks of flushing to obtain 20% damage. Further, the inventor herein has discovered that providing a breaker to substantially lower the viscosity of the fluid once the fracturing is completed can prevent the proppant from flowing back to the surface once the well is put on production. This prevents damage to equipment, lines, and valves due to the abrasiveness of the proppant.

The present invention provides fluid stable compositions having stable viscosities above 300° F. (149° C.) that are also pH sensitive so that the fluids may be easily treated to reduce the viscosity and obtain easier flowback and less formation damage.

SUMMARY OF THE INVENTION

This invention relates to well treatment fluids comprising amphoteric surfactant(s), water, non-aqueous solvent(s) and optionally an acid forming compound (provided that if the acid forming compound is present a hydrophilic alcohol may also be optionally present.) and methods of using those fluids to treat or fracture subterranean formations.

BRIEF DESCRIPTION OF THE DRAWINGS

FIG. 1 is a drawing of an electron micrograph illustrating the vesicle structure of a fluid of this invention.

DETAILED DESCRIPTION OF THE INVENTION

This invention relates to well treatment fluids comprising:
(a) one or more amphoteric surfactants, preferably present at about 1 to about 50 weight percent, more preferably 1 to 40 weight percent, more preferably about 2 to about 30 weight percent, even more preferably at about 5 to about 25 weight percent based upon the weight of the fluid;
(b) water, preferably present at about 30 to about 95 weight percent, more preferably about 40 to about 90 weight percent, even more preferably at about 50 to about 85 weight percent, based upon the weight of the fluid;
(c) non-aqueous solvent(s), preferably present at about 0.1 to about 25 weight percent, more preferably about 0.5 to about 20 weight percent, even more preferably at about 1 to about 15 weight percent, based upon the weight of the fluid; and
(d) optionally, an acid forming compound preferably present at about 0.005 to about 10 weight percent, more preferably about 0.01 to about 5 weight percent, even more preferably at about 0.05 to about 2 weight percent, based upon the weight of the fluid, provided that when the acid forming compound is present a hydrophilic alcohol (i.e. preferably an alcohol that retards the hydrolysis reaction of the acid forming compound) may also be present at about 0.1 to about 15 weight percent, more preferably about 0.5 to about 12 weight percent, even more preferably at about 1 to about 8 weight percent, based upon the weight of the fluid.

In a preferred embodiment, the amphoteric surfactant is present at about 8 weight percent to about 10 weight percent and the solvent is present at about 5 weight percent to about 7 weight percent.

In a preferred embodiment, the water may be freshwater or salt water. In another embodiment, the water may be seawater or water that has had a salt added to it. Such salts include potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, potassium acetate and mixtures thereof. In one embodiment, the salt is present at up to 4 weight % and the salt water is used to treat the formation prior to introducing the fluid into the formation.

In another embodiment, the pH of the fluid is, or is adjusted to, about 6.5 or more, more preferably 7 or more, more preferably 8 or more, more preferably 9 or more, more preferably between 9 and 15, more preferably between 7.5 and 9.5. The pH may be adjusted by any means known in the art, including adding acid or base to the fluid, bubbling $CO_2$ through the fluid and the like.

In another embodiment, the fluid further comprises a hydrophobic organic alcohol, preferably a $C_4$ to $C_{20}$ hydrophobic alcohol, preferably $C_4$ to $C_{20}$ linear alcohols, preferably an alcohol selected from the group consisting of diethanol, propanol, butanol, pentanol, heptanol, nonanol, decanol, dodecanol, phenol, propanol alcohol ethers, butanol alcohol ethers, ethylbenzyl alcohol, 2-ethyl-1-hexanol, 1-octanol, 2-octanol, and mixtures thereof.

In a preferred embodiment, the hydrophilic alcohol is one that is soluble or is miscible with the acid forming compound. Examples of preferred hydrophilic alcohols include methanol, ethanol, propanol, butanol, ethylene glycol, propylene glycol, poly ethylene glycol, poly propylene glycol, dihydric alcohol, poly hydydric alcohol and sugar alcohols and mixtures thereof.

In a preferred embodiment, the amphoteric surfactant is lecithin obtained from soybeans and is composed mostly of phosphatidylcholine, phosphatidylethanolamine, and phosphatidylinositol. In another preferred embodiment, the amphoteric surfactant is chemically or enzymatically modified. The lecithin may be natural or synthetic lecithin. For more information on lecithin and its many variants, please see the Kirk-Othmer Encyclopedia of Chemical Technology, $4^{th}$ ed. Volume 15, pages 192–210, John Wiley & Sons, 1995. Lecithins Sources, Manufacture & Uses, by Bernared F. Szuhaj, American Oil Chemists' Society, 1985 and Lecithins, by Bernard F. Szuhaj and Gary R. List, American Oil Chemists' Society, 1985.

In another embodiment, the non-aqueous solvent comprises one or more hydrocarbons and/or halogenated hydrocarbons, preferably aliphatic or aromatic hydrocarbons, more preferably an alcohol, a mineral oil, soybean oil, corn oil, a fatty acid, a glycol ether, an ether or a mixture thereof. In a particularly preferred embodiment the solvent is a linear, branched or cyclic $C_1$ to $C_{100}$ alcohol, preferably a linear or branched $C_4$ to $C_{20}$ alcohol. Specific examples of preferred solvents include 2-ethyl hexanol, ethylene glycol monobutyl ether, or mixtures thereof.

In another embodiment, the fluid optionally comprises an acid forming compound. In a preferred embodiment the acid forming compound comprises an organic or inorganic acid, preferably an organic acid, even more preferably an ester, an anhydride, an acid halide, a polyglycolic acid or a mixture thereof. In a preferred embodiment, the acid forming compound comprises methyl formate, ethyl formate, propyl formate, butyl formate, methyl acetate, ethyl acetate, propyl acetate, butyl acetate, ethylene glycol monobutyl acetate, acetic anhydride, acetic formic anhydride, succinic anhydride, tetrachlorophthalic anhydride, chloro ethyl formate, chloro ethyl acetate, chloro, polyglycolic acid, ethylene glycol diformate, ethylene glycol diacetate and the like and mixtures thereof.

In a preferred embodiment, the acid forming compound is present and is methyl formate, ethyl formate, propyl formate and butyl formate and the hydrophilic alcohol if present is methanol, ethanol, propanol or butanol.

In another embodiment, the fluid further contains conventional constituents such as corrosion inhibitors, fluid loss additives, gases such as carbon dioxide or nitrogen and the like.

In another embodiment, the fluid has a viscosity at 100 $sec^{-1}$ of 100 centipoise or more at 100° F. (37.8° C.). In another embodiment, the fluid has a viscosity at 100 $sec^{-1}$ of 300 centipoise or more at 100° F. (37.8° C.). In another embodiment, the fluid has a viscosity at 100 $sec^{-1}$ of 310 centipoise or more at 100° F. (37.8° C.). In another embodiment, the fluid has a viscosity at 100 $sec^{1}$ of 350 centipoise or more at 200° F. (93.3° C.). In another embodiment, the fluid has a viscosity at 100 $sec^{-1}$ of 250 centipoise or more at 150° F. (65.6° C.). In another embodiment, the fluid has a viscosity at 100 $sec^{-1}$ of 300 centipoise or more at 150° F. (65.6° C.). In another embodiment, the fluid has a viscosity at 100 $sec^{-1}$ of 100 centipoise or more at 180° F. (82.2° C.). In another embodiment, the fluid has a viscosity at 100 $sec^{-1}$ of 250 centipoise or more at 180° F. (82.2° C.). In another embodiment, the fluid has a viscosity at 100 $sec^{-1}$ of 110 centipoise or more at 280° F. (137.8° C.).

In another embodiment, the fluid has a viscosity at 100 $sec^{-1}$ of 100 centipoise or more at 150° F. (65.6° C.), preferably a viscosity at 100 $sec^{-1}$ of 100 centipoise or more at 175° F. (79.4° C.), even more preferably a viscosity at 100 $sec^{-1}$ of 100 centipoise or more at 200° F. (93.3° C.), preferably a viscosity at 100 $sec^{-1}$ of 100 centipoise or more at 225° F. (107.2° C.), even more preferably a viscosity at 100 $sec^{-1}$ of 100 centipoise or more at 240° F. (115.6° C.), preferably a viscosity at 100 $sec^{-1}$ of 100 centipoise or more at 250° F. (121.1° C.), even more preferably a viscosity at 100 $sec^{-1}$ of 100 centipoise or more at 275° F. (135° C.), preferably a viscosity at 100 $sec^{-1}$ of 100 centipoise or more at 300° F. (148.9° C.). In a preferred embodiment, the fluid has a viscosity at 100 $sec^{-1}$ of 100 centipoise or more at 320° F. (160° C.) and a pH of about 9.

Viscosity is measured by a Fann 50 rheometer using a B5 bob. About 30 ml of fluid is placed in the cup and is pressurized to 500 psig (3.5 MPa) with nitrogen to prevent boiling of the fluid when heated. These instruments may be obtained from Fann Instrument Company, Houston, Tex.

In a preferred embodiment, the fluid contains one or more proppant materials. Preferred proppant materials include gravel, sand, resin coated sand, ceramic beads, bauxite, glass, glass beads and the like that have sufficient compressive strength to hold open the fracture once the pressure is released, or mixtures thereof.

The proppants are typically present at amounts of about 1 to 20 pounds of proppant per gallon added (ppa), preferably about 4 to 18 ppa, more preferably 6 to 16 ppa. In another embodiment, the proppant has a mesh size of up to 60 mesh, preferably between 40 to 60 mesh. In another embodiment, 10 to 40 mesh is preferred.

The components of the fluid are preferably combined by mixing the surfactants and solvent or solvents and then adding the mixture to water or brine. Then pH is adjusted to the desired level In general the fluids may be prepared in any suitable manner. For example, the surfactants may be blended into the water or the solvent to the desired viscosity then the other components are added. The components may be combined in any order of addition. Standard mixing techniques maybe used with or without heat and or agitation.

In a particularly preferred embodiment, the well treatment fluid comprises:

(a) lecithin;

(b) water;

(c) an alcohol and/or a glycol ether;

(d) an acid forming compound; and (h) a hydrophilic alcohol;

and wherein the composition has a viscosity at 100 sec$^{-1}$ of 100 centipoise or more at 150° C. and a pH of 6.5 or above and wherein all or part of the fluid forms vesicles.

In a particularly preferred embodiment, the fluid comprises lecithin, water, and 2-ethyl-1-hexanol. In a preferred embodiment, this composition has a pH of 6.5 or more, preferably between 7 and 12, preferably between 7.5 and 9.5. In another embodiment, the water is salt water comprising potassium chloride, sodium chloride, ammonium chloride, calcium chloride, magnesium chloride, or a mixture thereof.

In one embodiment, the well treatment fluid of this invention is used to treat and or fracture subterranean formations, particularly petroliferous formations by injecting the fluids described herein into the formation at sufficient pressure to fracture the formation. Sufficient pressures are any pressure above the bottom hole pressure of the well plus friction pressure. Typically, the fluid is pumped into a formation at a pressure that will overcome the native overburden pressure of the formation causing fracture.

In another embodiment, the formation has been stabilized with an inorganic water soluble salt capable of inhibiting hydration prior to the fluids described herein being introduced into the formation.

In alternate embodiments, the well treatment fluid of this invention can also be used for hydraulic fracturing, drilling, drill-in, completion, work-over, packer, well treating, testing, spacer, polymer flooding, loss circulation, gravel pack, coil tubing, hole abandonment fluid, or viscous gel plugs used to clean out debris in pipelines.

The well treatment fluids of this invention preferably comprise vesicle structures. In general, vesicles may be described as bi-layered aggregates from surfactants or phospholipids. Typically, vesicles are supramolecular structures from phospholipids or surfactants or mixtures thereof in which the surface active compounds aggregate on a local scale into bilayers and the bilayers form closed shells. The diameter of a vesicle can vary from 200 Å to 1 millimeter, 10 millimeters or even 50 millimeters or more. The vesicles present in the fluids of the instant invention preferably have an diameter between 300 Å and 500 µm, preferably between 400 Å and 300 µm, more preferably between 450 Å and 100 µm, more preferably between 500 Å and 10 µm. Vesicles in a particular system are not necessarily of a uniform size and may have a wide distribution of sizes. In a preferred embodiment, greater that 50%, preferably greater than 70% more preferably greater than 90% of the vesicles in a sample will have a diameter greater than 200 Å, preferably greater than 300 Å, more preferably greater than 400 Å, more preferably greater than 500 Å, more preferably greater than 1000 Å, more preferably greater than 2000 Å, more preferably greater than 3000 Å, more preferably greater than 4000 Å, more preferably greater than 4500 Å, more preferably greater than 5000 Å, more preferably greater than 5500 Å, more preferably greater than 6000 Å. When the term vesicle is used herein it is meant to mean both unilamellar and multilamellar vesicles. In general, vesicles can be formed by agitating a lamellar liquid crystal so that the lamella peel off and form closed structures. In the instant invention the fluids described herein may be agitated to promote vesicle formation. FIG. 1 illustrates a vesicle structure of a fluid of the invention. For more information on vesicles please see Zubay, G.:*Biochemistry*, third edition (1993), pp. 174–175; Alberts et al. *Molecular Biology of the Cell*, third edition (1994), pp. 478–480, Y. Zheng et al, J. Phys Chem. B. Vol. 104, pgs 5263–5271, 2000, Y. Zheng and H. T. Davis, Langmuir, Vol. 16, pg 6453–6459, 2000 and J. Phys Chem. vol 98, No. 23, 1994 pg 5987), which are all incorporated by reference herein.

FIG. 1 is an electron micrograph where the sample was prepared by the CEVS (Controlled Environmental Vitrification System) method where the sample is cooled at a rate of $10^4$ to $10^5$ degrees per second prior to being subjected to transmission electron microscopy. Further information, including a complete description of the CEVS method used, may be found at J. Bellare et al, Journal of Electron Microscopy Technique, Vol. 10, pg 87–111, 1988, which is incorporated by reference herein.

EXAMPLES

Viscosity was measured according to American Petroleum Institute recommended procedure 13D as published in the third edition on Jun. 1, 1995, using a Fann 50 rheometer. A detail testing procedure is provide by Fann Instrument Company, Model 50SL Rheometer Instruction Manual, copyright 1996. A B5 bob and 30 ml of test fluid was used for all tests.

All percents are weight %, unless otherwise noted.

EXAMPLE 1

A viscous solution was prepared by adding 3 ml of 2-ethylhexanol to 74.5 ml of 3% by weight of a sodium chloride solution. Then 17.5 grams of dry amphoteric lecithin was mixed uniformly into the solution and the pH was adjusted to 12 by the addition of 5 ml of 30% by weight sodium hydroxide solution. A Fann 50 was used to measure the viscosity at 100 sec$^{-1}$ at increasing temperatures. The resulting solution has viscosities of 300 centipoise at 125° F. (52° C.) and 100 centipoise at 320° F. (160° C.).

EXAMPLE 2

A viscous solution was prepared by adding 10 ml of ethylene glycol monobutyl ether to 63 ml of a 3% by weight solution of a potassium chloride solution. Then 25 grams of a 63% by weight solution of amphoteric lecithin was mixed into the solution and 2 ml of a 30% by weight sodium hydroxide solution was added to increase the pH to 12. A Fann 50 was used to measure the viscosity at 100 sec$^{-1}$ at increasing temperatures. The solution maintained a viscosity above 100 centipoise up to 230° F. (110° C.).

EXAMPLE 3

An identical solution was prepared as described in example 2 except that the pH of the solution was reduced to 7 by bubbling carbon dioxide through the solution. A Fann 50 was used to measure the viscosity at 100 sec$^{-1}$ at increasing temperature. The solution had a viscosity above 350 centipoise up to 120° F. (49° C.) and had a viscosity below 20 centipoise at 140° F. (60° C.).

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly, it is not intended that the invention be limited thereby.

What is claimed is:

1. A well treatment fluid comprising:
   (a) one or more amphoteric surfactants;
   (b) water;
   (c) one or more nonaqueous solvents; and
   (d) an acid forming compound, wherein all or part of the fluid forms vesicles.
2. The fluid of claim 1 wherein the vesicles have a diameter of greater than 200 Å.
3. The fluid of claim 1 wherein greater than 50% of the vesicles have a diameter of greater than 500 Å.
4. The fluid of claim 1 wherein more than 50% of the vesicles have a diameter of between 300 Å and 500 µm.
5. The fluid of claim 1 wherein the diameter of the vesicles is between 500 Å and 10 µm.
6. The fluid of claim 1 wherein the water is fresh water, salt water or sea water.
7. The fluid of claim 1 wherein the fluid is subject to agitation.
8. The fluid of claim 1 wherein the one or more amphoteric surfactants are present at about 1 to about 40 weight percent, and the one or more nonaqueous solvents are present at about 0.1 to about 25 weight percent, based upon the weight of the fluid.
9. The fluid of claim 1 wherein the one or more amphoteric surfactants are present at about 2 to about 30 weight percent, and the one or more nonaqueous solvents are present at about 0.5 to about 20 weight percent, based upon the weight of the fluid.
10. The fluid of claim 1 wherein the one or more amphoteric surfactants are present at about 5 to about 25 weight percent, and the one or more nonaqueous solvents are present at about 1 to about 15 weight percent, based upon the weight of the fluid.
11. The fluid of claim 1 wherein the pH is about 6.5 or more.
12. The fluid of claim 1 wherein the pH is between about 7.5 and 9.5.
13. The fluid of claim 1 wherein the water comprises potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, potassium acetate or mixtures thereof.
14. The fluid of claim 1 wherein the one or more amphoteric surfactants comprise natural or synthetic lecithin.
15. The fluid of claim 1 wherein the one or more nonaqueous solvents comprise one or more aliphatic hydrocarbons, aromatic hydrocarbons, halogenated hydrocarbons, linear $C_1$ to $C_{100}$ alcohols, branched $C_3$ to $C_{100}$ alcohols, or cyclic $C_3$ to $C_{100}$ alcohols.
16. The fluid of claim 1 wherein the one or more nonaqueous solvents comprise an alcohol, a mineral oil, a fatty acid, soybean oil, corn oil, a glycol ether, an ether or mixture thereof.
17. A well treatment fluid comprising:
    (a) one or more amphoteric surfactants;
    (b) water; and
    (c) one or more nonaqueous solvents, wherein the one or more nonaqueous solvents comprise 2-ethyl hexanol, ethylene glycol monobutyl ether, or mixtures thereof, and wherein all or part of the fluid forms vesicles.
18. The fluid of claim 1 wherein the one or more amphoteric surfactants comprise lecithin, the one or more nonaqueous solvents comprise an alcohol, a mineral oil, a fatty acid, soybean oil, corn oil, a glycol ether, an ether or mixture thereof and the acid forming compound comprises methyl formate, ethyl formate, propyl formate and butyl formate and wherein the fluid further optionally comprises a hydrophilic alcohol in addition to said one or more nonaqueous solvents, and wherein the hydrophilic alcohol if present comprises methanol, ethanol, propanol or butanol.
19. The fluid of claim 1 wherein the fluid has a viscosity at 100 sec$^{-1}$ of 100 centipoise or more at 100° F.
20. The fluid of claim 1 wherein the fluid has a viscosity at 100 sec$^{-1}$ of 300 centipoise or more at 100° F.
21. The fluid of claim 1 wherein the fluid has a viscosity at 100 sec$^{-1}$ of 300 centipoise or more at 125° F.
22. The fluid of claim 1 wherein the fluid has a viscosity at 100 sec$^{-1}$ of 100 centipoise or more at 300° F.
23. A well treatment fluid comprising:
    (a) one or more amphoteric surfactants;
    (b) water;
    (c) one or more nonaqueous solvents; and
    (d) proppant, wherein the proppant comprises gravel, sand, resin coated sand, ceramic beads, bauxite, glass, glass beads, or mixtures thereof, and wherein all or part of the fluid forms vesicles.
24. A method to treat and/or fracture a subterranean formation comprising:
    injecting a well treatment fluid into the formation at sufficient pressure to fracture the formation, wherein all or part of the fluid forms vesicles and the well treatment fluid comprises:
    (a) one or more amphoteric surfactants;
    (b) water;
    (c) one or more nonaqueous solvents; and
    (d) optionally, an acid forming compound, and wherein at least 50% of the vesicles have a diameter of 500 Å or more.
25. The method of claim 24 wherein the subterranean formation comprises a petroliferous formation.
26. The method of claim 24 wherein the water is fresh water, sea water or salt water.
27. The method of claim 24 wherein the water comprises potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, potassium acetate or mixtures thereof.

28. The method of claim 24 wherein the one or more amphoteric surfactants are present at about 1 to about 40 weight percent, based upon the weight of the fluid, and the one or more nonaqueous solvents are present at about 0.1 to about 25 weight percent, based upon the weight of the fluid.

29. The method of claim 24 wherein the one or more amphoteric surfactants are present at about 2 to about 30 weight percent, based upon the weight of the fluid and the one or more nonaqueous solvents are present at about 0.5 to about 20 weight percent, based upon the weight of the fluid.

30. The method of claim 24 wherein the pH is between about 7.5 and 9.5.

31. The method of claim 24 wherein the one or more amphoteric surfactants comprise natural or synthetic lecithin.

32. The method of claim 24 wherein the acid forming compound is present and comprises methyl formate, ethyl formate, propyl formate, ethylene glycol diformate, ethylene glycol diacetate and/or butyl formate and wherein the fluid further optionally comprises a hydrophilic alcohol in addition to said one or more nonaqueous solvents, and wherein the hydrophilic alcohol if present is methanol, ethanol, propanol and/or butanol.

33. The method of claim 24 wherein the one or more nonaqueous solvents comprise one or more aliphatic hydrocarbons, aromatic hydrocarbons, halogenated hydrocarbons, linear $C_1$ to $C_{100}$ alcohols, branched $C_3$ to $C_{100}$ alcohols or cyclic $C_3$ to $C_{100}$ alcohols.

34. The method of claim 24 wherein the one or more nonaqueous solvents comprise an alcohol, a mineral oil, a fatty acid, soybean oil, corn oil, a glycol ether, an ether or mixture thereof.

35. The method of claim 24 wherein the one or more nonaqueous solvents comprise 2-ethyl hexanol, ethylene glycol monobutyl ether or mixtures thereof.

36. The method of claim 24 wherein the one or more amphoteric surfactants comprise lecithin, the one or more nonaqueous solvents comprise an alcohol, a mineral oil, a fatty acid, soybean oil, corn oil, a glycol ether, an ether or mixture thereof and the acid forming compound is present and comprises methyl formate, ethyl formate, propyl formate and butyl formate and wherein the fluid further optionally comprises a hydrophilic alcohol in addition to said one or more nonaqueous solvents, and wherein the hydrophilic alcohol if present is methanol, ethanol, propanol or butanol.

37. The method of claim 24 wherein the fluid has a viscosity at 100 $sec^{-1}$ of 100 centipoise or more at 100° F.

38. The method of claim 24 wherein the fluid has a viscosity at 100 $sec^{-1}$ of 300 centipoise or more at 100° F.

39. The method of claim 24 wherein the fluid has a viscosity at 100 $sec^{-1}$ of 300 centipoise or more at 125° F.

40. The method of claim 24 wherein the fluid has a viscosity at 100 $sec^{-1}$ of 100 centipoise or more at 300° F.

41. The method of claim 24 further comprising proppant wherein the proppant comprises gravel, sand, resin coated sand, ceramic beads, bauxite, glass, glass beads, or mixtures thereof.

42. The method of claim 24 wherein prior to injecting the fluid into the formation, the formation has been stabilized with an inorganic water soluble salt capable of inhibiting hydration.

43. The method of claim 24 wherein the acid forming compound is present and comprises an ester, an anhydride, an acid halide, a polyglycolic acid or a mixture thereof.

44. The method of claim 24 wherein the acid forming compound is present and comprises methyl formate, ethyl formate, propyl formate, butyl formate, methyl acetate, ethyl acetate, propyl acetate, butyl acetate, ethylene glycol monobutyl acetate, acetic anhydride, acetic formic anhydride, succinic anhydride, tetrachlorophthalic anhydride, chloro ethyl formate, chloro ethyl acetate, polyglycolic acid, ethylene glycol diformate, ethylene glycol diacetate or mixtures thereof.

45. A method to treat and/or fracture a subterranean formation comprising:
   injecting a well treatment fluid into the formation at sufficient pressure to fracture the formation, wherein all or part of the fluid forms vesicles and the well treatment fluid comprises:
   (a) one or more amphoteric surfactants;
   (b) water; and
   (c) one or more nonaqueous solvents.

* * * * *